US010465656B2

(12) United States Patent
Hoffmann

(10) Patent No.: US 10,465,656 B2
(45) Date of Patent: Nov. 5, 2019

(54) WIND TURBINE ROTOR BLADE, WIND TURBINE AND METHOD FOR OPERATING A WIND TURBINE

(71) Applicant: WOBBEN PROPERTIES GMBH, Aurich (DE)

(72) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 334 days.

(21) Appl. No.: 15/318,960

(22) PCT Filed: Jun. 17, 2015

(86) PCT No.: PCT/EP2015/063555
§ 371 (c)(1),
(2) Date: Dec. 14, 2016

(87) PCT Pub. No.: WO2015/193353
PCT Pub. Date: Dec. 23, 2015

(65) Prior Publication Data
US 2017/0130698 A1 May 11, 2017

(30) Foreign Application Priority Data
Jun. 18, 2014 (DE) .................. 10 2014 211 741

(51) Int. Cl.
F03D 1/06 (2006.01)
F03D 7/02 (2006.01)
F03D 80/30 (2016.01)

(52) U.S. Cl.
CPC ......... *F03D 7/0236* (2013.01); *F03D 1/0633* (2013.01); *F03D 1/0675* (2013.01);
(Continued)

(58) Field of Classification Search
CPC .... F03D 1/0633; F03D 1/0675; F03D 7/0236; F03D 80/30; F05B 2240/312; Y02E 10/721
See application file for complete search history.

(56) References Cited

U.S. PATENT DOCUMENTS 3,814,351 A * 6/1974 Bielawa ................. B64C 27/10
244/17.19
4,335,996 A 6/1982 Ross
(Continued)

FOREIGN PATENT DOCUMENTS

DE 102004022730 A1 11/2005
DE 202006000673 U1 7/2006
(Continued)

*Primary Examiner* — Igor Kershteyn
(74) *Attorney, Agent, or Firm* — Seed Intellectual Property Law Group LLP

(57) ABSTRACT

A rotor blade of a wind turbine, comprising a first rotor-blade portion and a second rotor-blade portion. In this case, the first and the second rotor-blade portion constitute a total length of the rotor blade and, upon a rotation of the rotor blade, the first rotor-blade portion and the second rotor-blade portion can be moved relative to each other, along a longitudinal axis of the rotor blade, as a result of a centrifugal force acting upon the rotor blade, in such a way that the total length of the rotor blade can be altered.

21 Claims, 6 Drawing Sheets

(52) U.S. Cl.
CPC ........ *F03D 80/30* (2016.05); *F05B 2240/312* (2013.01); *Y02E 10/721* (2013.01)

(56) References Cited

U.S. PATENT DOCUMENTS

| | | | | |
|---|---|---|---|---|
| 4,533,297 | A | * | 8/1985 | Bassett ................ F03D 1/0658 416/11 |
| 4,710,101 | A | | 12/1987 | Jamieson |
| 6,726,439 | B2 | * | 4/2004 | Mikhail ................ F03D 7/0236 415/4.1 |
| 6,923,622 | B1 | | 8/2005 | Dehlsen |
| 7,582,977 | B1 | * | 9/2009 | Dehlsen ................ F03B 17/061 290/1 R |
| 7,997,875 | B2 | | 8/2011 | Nanukuttan et al. |
| 8,459,948 | B2 | * | 6/2013 | Caraballoso ............ B64C 27/46 416/143 |
| 8,485,782 | B2 | | 7/2013 | Turmanidze et al. |
| 2003/0123973 | A1 | * | 7/2003 | Murakami ............ F03D 1/0675 415/4.1 |
| 2003/0223868 | A1 | * | 12/2003 | Dawson ................ F03D 7/0236 416/1 |
| 2003/0230898 | A1 | * | 12/2003 | Jamieson ............. F03D 7/0236 290/55 |
| 2010/0196159 | A1 | * | 8/2010 | Dawson ................ F03D 1/0675 416/87 |
| 2010/0266408 | A1 | * | 10/2010 | Dawson ................ H02G 13/00 416/87 |
| 2012/0027594 | A1 | * | 2/2012 | Lewke .................. F03D 1/0608 416/146 R |
| 2013/0259697 | A1 | | 10/2013 | Herrig et al. |
| 2015/0003994 | A1 | * | 1/2015 | Braaten ................ F03D 1/0633 416/237 |
| 2015/0016996 | A1 | | 1/2015 | Rohden |

FOREIGN PATENT DOCUMENTS

| | | |
|---|---|---|
| DE | 102011055370 A1 | 5/2012 |
| DE | 102011122504 A1 | 3/2013 |
| EP | 1375911 A1 | 1/2004 |
| WO | 2008142498 A1 | 11/2008 |

* cited by examiner

WIND TURBINE ROTOR BLADE, WIND TURBINE AND METHOD FOR OPERATING A WIND TURBINE

BACKGROUND

Technical Field

The present invention relates to a rotor blade of a wind turbine, to a wind turbine, and to a method for operating a wind turbine.

Description of the Related Art

Wind turbines used for generating electricity are known in general. In this case, the mechanical power that the rotor draws from the wind depends, inter alia, on the design of the rotor blades. Depending on the wind conditions, an optimum power draw also depends on the surface area of the rotor blades, and therefore also on the length of the rotor blades. In order to generate more energy, it is generally desirable for rotor blades to be of a great length, which defines the rotor diameter. The rotor diameter is limited in its size, however. If a rotor diameter is too large, high wind speeds, e.g., in the case of storms or gusts, can result in high mechanical loads on the wind turbine, causing damage to the latter. The design of the rotor blades must therefore take such high wind speeds into account, which may usually result in a smaller rotor diameter, and consequently in a lesser output of the wind turbine. In order to keep the reduction in the rotor diameter as small as possible, measures are already known for effecting control in the case of storms, such as, for example, adjusting the angle of attack.

Also already known is the concept of providing an extendable rotor blade. Such extendable rotor blades have the advantage that they can provide a large rotor blade surface area, or rotor blade length, in the case of low wind speeds, but provide a smaller rotor blade surface area in the case of storms, gusts, or the like. At present, however, such extendable rotor blades remain complicated and difficult to implement.

In the priority-establishing German patent application, the German Patent and Trade Marks Office searched the following documents: DE 10 2004 022 730 A1, DE 10 2011 055 370 A1, DE 10 2011 122 504 A1, DE 20 2006 000 673 U1, U.S. Pat. No. 6,923,622 B1, U.S. 2013/0259697 A1, U.S. Pat. No. 4,710,101 and EP 1 375 911 A1.

BRIEF SUMMARY

Disclosed is a wind-turbine rotor blade comprising a first rotor-blade portion and a second rotor-blade portion, which together constitute a total length of the rotor blade. In this case, upon a rotation of the rotor blade, the first and the second rotor-blade portions can be moved relative to each other, along a longitudinal axis of the rotor blade, as a result of a centrifugal force acting upon the rotor blade, in such a way that the total length of the rotor blade can be altered.

The total length of the rotor blade defines the rotor-blade diameter of the wind turbine, and consequently the surface area acted upon by the wind. Moving the first and second rotor-blade portions relative to each other alters the surface area acted upon by the wind. When the wind turbine is in an idle state, i.e., when the rotor blades of the wind turbine are not rotating, the total length of its individual rotor blades is at a minimum. When the rotor blades begin to move, i.e., when rotation of the respective rotor blade occurs, a centrifugal force acts upon the rotor blade. The present invention in this case utilizes the centrifugal force in such a way that the first and the second rotor-blade portion move in relation to each other as a result of the centrifugal force. This means that the second rotor-blade portion is moved, in the direction of the longitudinal axis, out of and/or on the first rotor-blade portion, away from the rotor-blade root, in the longitudinal direction of the rotor blade. As a result, in comparison with the idle state, the total length of the rotor blade becomes greater, and consequently so does the surface area acted upon by the wind. Alternatively, the first rotor-blade portion may also be moved. Altering, or adapting, the total length of the rotor blade thus enables the wind turbine to be adapted to the prevailing wind speeds. The efficiency of such a wind turbine can therefore be increased. Moreover, advantageously, such a rotor blade can basically be used irrespective of differing output and wind classes, i.e., across a plurality of output classes. Accordingly, the same rotor blade can be produced for a variety of sites, which reduces the resource input for production. In particular, such a rotor blade in this case has a total length of at least 40 m.

In this case, the relative movement of the first and the second rotor-blade portion is effected as a result of centrifugal force produced upon a rotation of the rotor blade. It is therefore possible to achieve a simple structure of the rotor blade, or of the individual rotor-blade portions.

Preferably, the second rotor-blade portion is disposed, at least partially, in the first rotor-blade portion, and/or the first rotor-blade portion has an opening, through which the second rotor-blade portion can be moved out of the first rotor-blade portion. The first rotor-blade portion in this case is disposed on the root of the rotor blade. In particular, it constitutes the total length of the rotor blade in the case of a second rotor-blade portion having been retracted. The second rotor-blade portion in this case, when in a retracted state, is provided in the first rotor-blade portion, in particular, in such a manner that only the rotor-blade tip of the second rotor-blade portion projects out of the first rotor-blade portion, or matches the outer shape of the first rotor-blade portion, such that the aerodynamic behavior of the rotor blade is not impaired. The opening in this case is provided, in particular, such that the second rotor-blade portion can be guided through this opening, out of the first rotor-blade portion. It therefore has substantially the shape of the profile of the second rotor-blade portion, and/or corresponds approximately to the size of the profile of the second rotor-blade portion. Alternatively, the opening may be realized so as to be larger than the profile of the first rotor-blade portion.

Preferably, the second rotor-blade portion is connected to the first rotor-blade portion by means of a rope winch device for retracting the second rotor-blade portion into the first rotor-blade portion. Such a rope winch device has, for example, a reel, on which a rope, belt, cable or similar is wound. The winding in this case may be effected mechanically, electrically or hydraulically. The reel in this case is disposed in the first rotor-blade portion. The rope, at its free end, is provided on the second rotor-blade portion. A connection is thereby created between the first and the second rotor-blade portion. By the addition of rope, the second rotor-blade portion can be moved relative to the first rotor-blade portion, in the direction of the longitudinal axis of the rotor blade. If there is a centrifugal force acting upon the second rotor-blade portion, the latter moves outwardly in the direction of the longitudinal axis, i.e., away from the rotor-blade root. The rope is unwound from the reel. The rotor-blade diameter, or the total length of the rotor blade, becomes greater. If the second rotor-blade portion has been extended and has to be retracted again because of high wind speeds, i.e., if the rotor diameter, or the total length of the rotor blade, has to be reduced, the rope is drawn in, or wound on to the reel.

In a preferred embodiment, the rope winch device comprises a rope for fastening to the second rotor-blade portion, the rope being made of a synthetic, polyethylene-based chemical fiber, in particular having an ultra-high molecular weight. In this case, such a rope has, in particular, very high tensile strength values, in particular in a range of from 3 to 4 GPa. Accordingly, such a rope can withstand very high tensile loads. When the second rotor-blade portion is moved out of the first rotor-blade portion as a result of the centrifugal force out of the first rotor-blade portion, and the rope thereby becomes tensioned, the rope can withstand the occurring tensile force without sustaining damage as a result. In addition, such a rope is highly resistant to abrasion.

Preferably, the rotor blade has a measuring means for measuring the wind speed, and/or the rope winch device is realized in such a manner that the second rotor-blade portion is retracted and/or extended in the case of a predefined wind speed. The predefined wind speed in this case is the so-called rated speed, i.e., the wind speed at which the wind turbine delivers its rated output. If the wind speed is less than the rated speed, the wind turbine is in the so-called partial-load range. As a result of the second rotor-blade portion being extended when in the partial-load range, i.e., in the case of a wind speed that is less than the predefined wind speed, the rated speed, and consequently also the rated output, are achieved more rapidly. The efficiency of the wind turbine is thereby increased. If the wind speed goes above the rated speed, the wind turbine is usually switched off in order to avoid damage. If the rated speed is exceeded, the second rotor-blade portion is retracted, such that the surface area swept by the wind is reduced. Damage to the rotor blades is thus prevented. In this case, a measuring means such as, for example, a hot-wire measuring device, a nacelle anemometer or rotating-cup anemometer, is used to measure the prevailing wind speed.

In a preferred embodiment, the first rotor-blade portion has a guide device, for guiding and supporting the second rotor-blade portion inside the first rotor-blade portion. The guide device in this case has at least two guide elements, for guiding the second rotor-blade portion in the direction of the longitudinal axis of the rotor blade, and at least two spring elements, which connect the at least two guide elements to the first rotor-blade portion. The guide device in this case is disposed, in particular, around the second rotor-blade portion, at least partially surrounding the second rotor-blade portion. The guide elements and spring elements in this case are, in particular, distributed uniformly over the entire length of the guide device and/or provided on the suction and pressure side of the second rotor-blade portion, such that the second rotor-blade portion can be moved out of the first rotor-blade portion or into the first rotor-blade portion in an even and stable manner. The guide elements in this case are realized, in particular, as rails or rollers, which are suspended in the guide device by means of the spring elements. The spring elements are realized, for example, as spiral springs. This has the advantage that the second rotor-blade portion is supported in a simple manner in the first rotor-blade portion, and is guided in a stable and reliable manner. Oscillations occurring on the rotor blade are compensated by the spring elements.

In a particularly preferred embodiment, the guide elements are designed as rollers, in particular plastic rollers. In this case, such plastic rollers are of a light weight and are easy to produce.

In a further preferred embodiment, the guide device is realized in the shape of a box and is disposed, in the longitudinal direction, inside the first rotor-blade portion. The second rotor-blade portion in this case is provided inside the guide device, i.e., inside the box. The second rotor-blade portion is consequently at least partially surrounded by box walls that are substantially parallel to each other. The guide elements and the spring elements are disposed uniformly around the second rotor-blade portion. The second rotor-blade portion can thus be guided and supported sufficiently in the first rotor-blade portion. The guide device in this case is, in particular, part of the first rotor-blade portion, e.g., part of the spar. There is therefore no need for a separate component in which the guide elements and spring elements are provided.

Preferably, the length of the guide device is one third of the length of the second rotor-blade portion moved out of the first rotor-blade portion. The length of the guide device in this case relates to the longitudinal axis of the rotor blade. The guide device in this case is disposed, in particular, around the second rotor-blade portion. It thus surrounds the second rotor-blade portion with its entire length. This ensures that the second rotor-blade portion has sufficient stability and support, even when in the extended state.

In a preferred embodiment, the extendable length of the second rotor-blade portion corresponds approximately to one tenth of the total rotor-blade length. The extendable length in this case corresponds to the length of the second rotor-blade portion that projects out of the first rotor-blade portion, i.e., to the maximum length between the rotor-blade tip of the first rotor-blade portion and the rotor-blade tip of the second rotor-blade portion. The length in this case relates to the longitudinal axis of the rotor blade. Accordingly, the total length of the rotor blade can be increased by one tenth. The efficiency of the wind turbine is thereby increased.

In a particularly preferred embodiment, the first rotor-blade portion has a first rotor-blade tip, and the second rotor-blade portion has a second rotor-blade tip. In this case, the rotor-blade tip of the first rotor-blade portion and that of the second rotor-blade portion are each realized as a winglet, and/or the rotor-blade tip of the second rotor-blade portion is provided in an opposite direction to the first rotor-blade tip. A winglet in this case is to be understood to mean an add-on at the ends of the rotor-blade portions, which deviates by a predefined angle from the longitudinal axis of the rotor blade.

The two rotor-blade portions each have a so-called winglet, the two winglets being provided in mutually opposite directions. In the case of a retracted second rotor-blade portion, at the end of the rotor blade there is thus provided a rotor-blade closure in the shape of a T. This has the advantage that the resistance and eddy formation on the rotor blade is further reduced, in comparison with conventional winglets. This embodiment can thus further reduce the eddy falling by at the ends of the rotor blades. The noise produced by the falling eddy is thus likewise reduced. The yield of the wind turbine can be increased.

Preferably, the second rotor-blade portion has a stop, at an end opposite to the rotor-blade tip, for ensuring a predefined extendable length. The stop may be realized, for example, in the form of a full-perimeter edge at the end of the profile of the second rotor-blade portion. This edge, or the stop, strikes against the guide deice, thereby preventing the second rotor-blade portion from being extended further out of the first rotor-blade portion.

In a preferred embodiment, the second rotor-blade portion has a substantially constant profile depth over its entire length. In this case, the second rotor-blade portion has substantially no twist. This has the advantage that the second rotor-blade portion can be guided evenly out of the first rotor-blade portion.

Preferably, the first and/or second rotor-blade portion is produced substantially from a fibrous composite material and/or wood, and the first and/or second rotor-blade tip is produced from a conductive material, in particular aluminium. This has the advantage that the first and/or second rotor-blade portion can be produced, in a lightweight design, from a conventional material such as fibrous composite material or balsa wood, thereby saving weight. Nevertheless, in this case a lightning strike on the rotor-blade tip can be diverted, without the rotor blade being destroyed.

In a particularly preferred embodiment, the first and or the second rotor-blade portion is connected to a lightning protection means by means of a metal rail and/or a metal cable. Lightning strikes can thus be diverted into the rotor blade.

Additionally proposed is a wind turbine having at least one rotor blade according to any one of the preceding embodiments. In this case, advantageously, such a wind turbine has three such rotor blades. The rotor blades together constitute the rotor diameter, which can be altered according to wind conditions. Use of the rotor blades thus makes it possible to increase the efficiency of the wind turbine, through a simple design. The rated output of such a wind turbine in this case is, in particular, a value of at least 2000 kW, preferably in a range of between 2000 kW and 3050 kW.

Also proposed is a method for operating a wind turbine having at least one rotor blade that has a first rotor-blade portion and a second rotor-blade portion. In this case, upon a rotation of the rotor blade, the first and the second rotor-blade portion are moved relative to each other by an occurring centrifugal force. The present invention in this case utilizes this centrifugal force in such a manner that the first and the second rotor-blade portion move in relation to each other as a result of the centrifugal force. This means that the second rotor-blade portion is moved, in the direction of the longitudinal axis, out of and/or on the first rotor-blade portion, away from the rotor-blade root, in the longitudinal direction of the rotor blade, and as a result, in comparison with the idle state, the total length of the rotor blade becomes greater, and consequently so does the surface area acted upon by the wind. The efficiency of the wind turbine is increased by the centrifugal force that occurs on the rotor blade in any case upon a rotation.

Preferably, the second rotor-blade portion is disposed in the first rotor-blade portion, and the second rotor-blade portion is moved out of the first rotor-blade portion by the centrifugal force occurring on the rotor blade out of the first rotor-blade portion, such that the surface area of the rotor blade acted upon by the wind is enlarged. The second rotor-blade portion in this case is, in particular, guided, or extended, out of the first rotor-blade portion. Provided for this purpose, in the first rotor-blade portion, there is a guide device, which guides the second rotor-blade portion out of the first rotor-blade portion in a reliable and stable manner.

In a preferred embodiment, the second rotor-blade portion is moved back into the first rotor-blade portion by means of a rope winch device, such that the surface area of the rotor blade acted upon by the wind is reduced in comparison with the surface area acted upon by the wind in the case of a fully extended second rotor-blade portion. As a result, the surface area acted upon the wind can be selectively reduced, in order to avoid damage to the rotor blade in the case of high wind speeds.

In a particularly preferred embodiment, the second rotor-blade portion is extended in the case of light wind, in particular in the partial-load range. If the wind speed is less than the rated speed, the wind turbine is in the so-called partial load range. Extending the second rotor-blade portion in the partial load range, i.e., in the case of a slight wind speed, the rated speed, and therefore also the rated output, are attained more rapidly. The efficiency of the wind turbine is thereby increased.

BRIEF DESCRIPTION OF THE SEVERAL VIEWS OF THE DRAWINGS

The invention is explained exemplarily in the following on the basis of exemplary embodiments, with reference to the accompanying figures. The figures in this case contain partially simplified, schematic representations.

DETAILED DESCRIPTION

Figure 1:
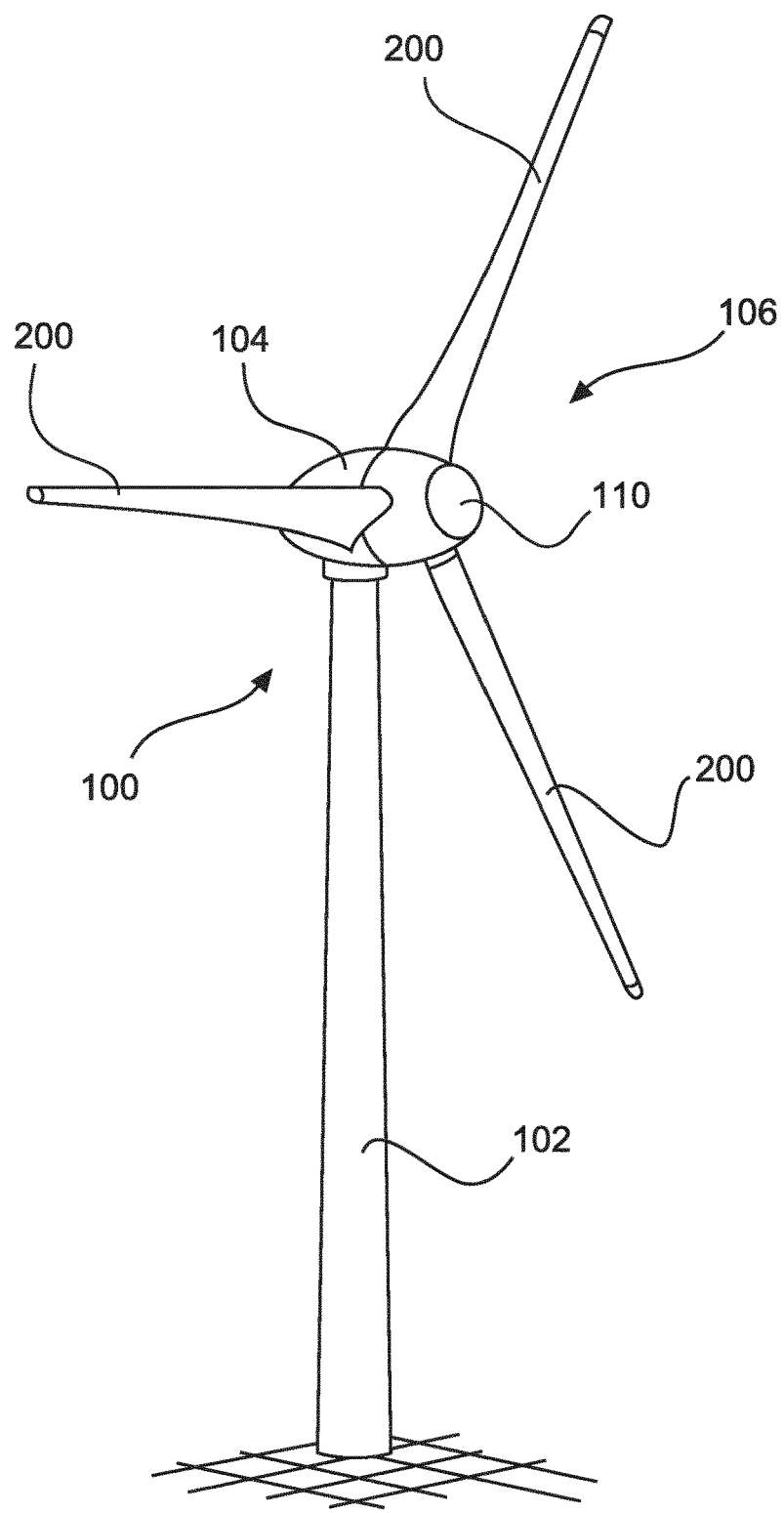
FIG. 1 shows a wind turbine, in a perspective view.

FIG. 1 shows a wind turbine 100 having a tower 102 and a nacelle 104. Disposed on the nacelle 104 is a rotor 106, having three rotor blades 200 and a spinner 110. When in operation, the rotor 106 is put into a rotary motion by the wind, and thereby drives a generator in the nacelle 104.

Figure 2:
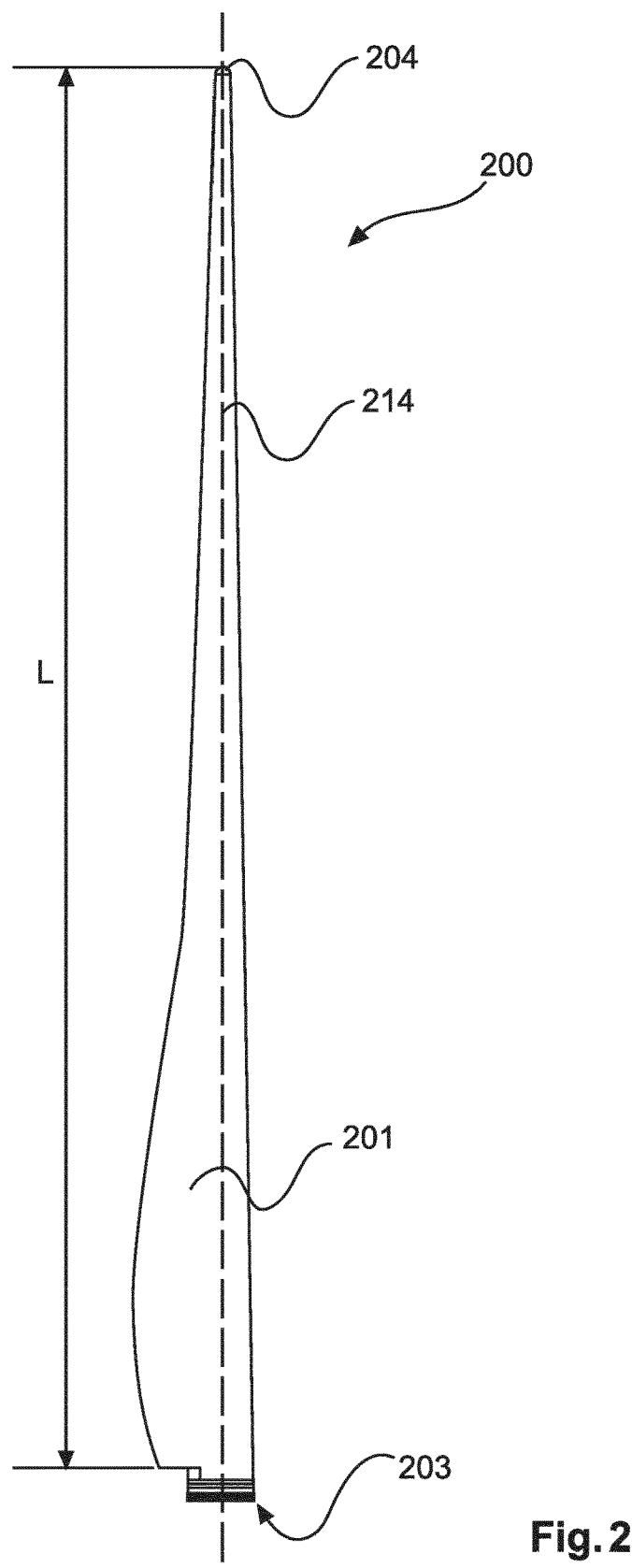
FIG. 2 shows a rotor blade, in a side view.

FIG. 2 shows a side view of a rotor blade 200 of one embodiment, over its entire length L. The rotor blade 200 has a first rotor-blade portion 201, and has a second rotor-blade portion (not represented). In addition, the rotor blade 200 has a rotor-blade root 203 at one end, and at the end that faces away from the latter has a rotor-blade tip 204. The figure also shows a longitudinal axis 214 of the rotor blade 200.

Figure 3:
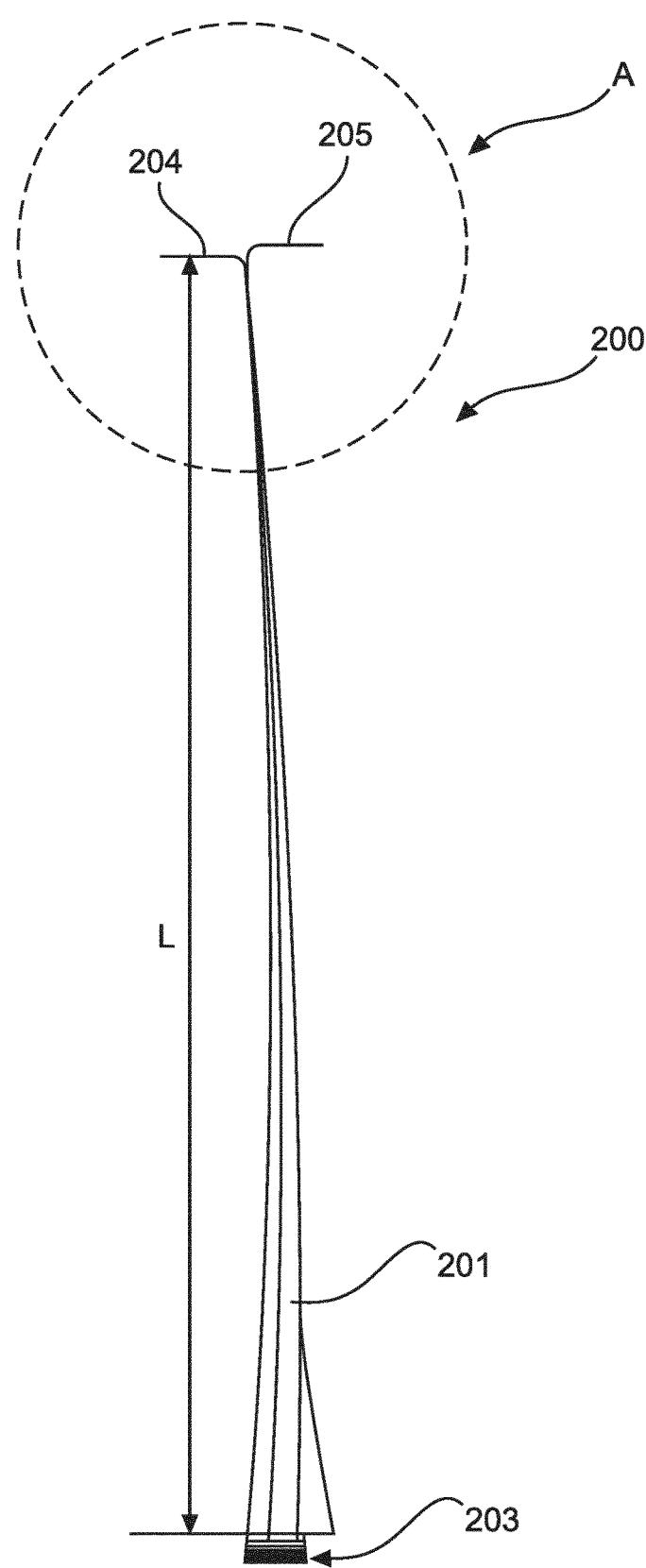
FIG. 3 shows the rotor blade of FIG. 2, in a further side view.

FIG. 3 shows a further side view of the rotor blade 200 of FIG. 2. The second rotor-blade portion has not been moved out of the first rotor-blade portion 201. The rotor blade 200 thus has its minimum total length L. The figure shows the rotor blade 200 with the first rotor-blade portion 201, having the first rotor-blade tip 204, as well as the second rotor-blade tip 205 of the second rotor-blade portion. The first rotor-blade tip 204 and the second rotor-blade tip 205 in this case are realized as a so-called winglet. They thus do not continue straight in the direction of the longitudinal axis 214 to the tip of the rotor blade, but are provided in a direction that deviates from the longitudinal axis 214 of the rotor blade 200. This lessens the edge eddy at the end of the rotor blade, and the noise of the wind turbine is reduced. The first rotor-blade tip 204 and the second rotor-blade tip 205 point in differing directions. This results in a so-called T-tip rotor blade.

Figure 4:
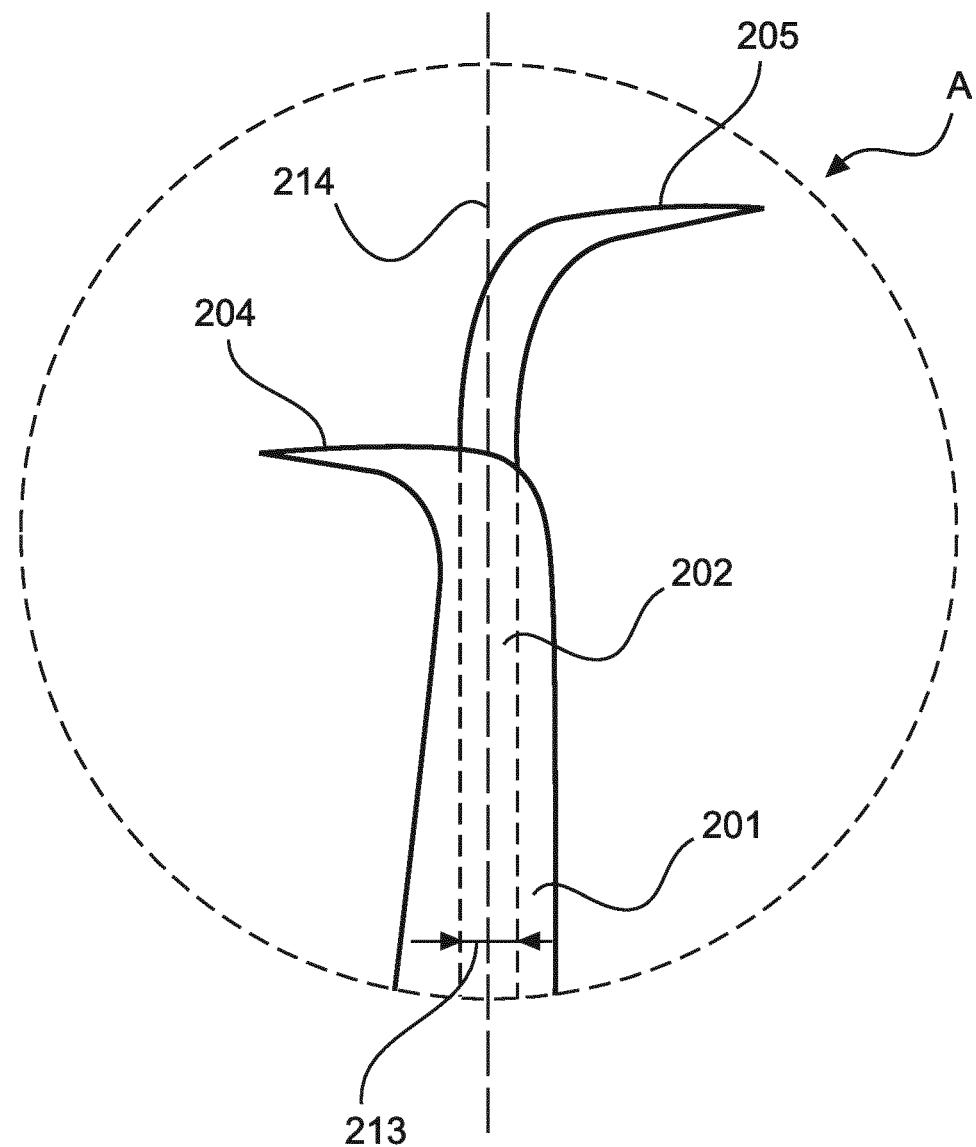
FIG. 4 shows a detail of the rotor blade from FIG. 3 in an extended state, in a side view.

FIG. 4 shows an enlarged detail of the rotor blade 200 from FIG. 3. It can be seen that the second rotor-blade portion 202 is disposed inside the first rotor-blade portion 201. The second rotor-blade portion 202 has been moved out of the first rotor-blade portion. Moreover, the profile depth 213 of the second rotor-blade portion 202 is designed so as to be substantially constant. It is thus ensured that the second rotor-blade portion 202 can be reliably retracted into and extended out of the first rotor-blade portion 201.

Figure 5:
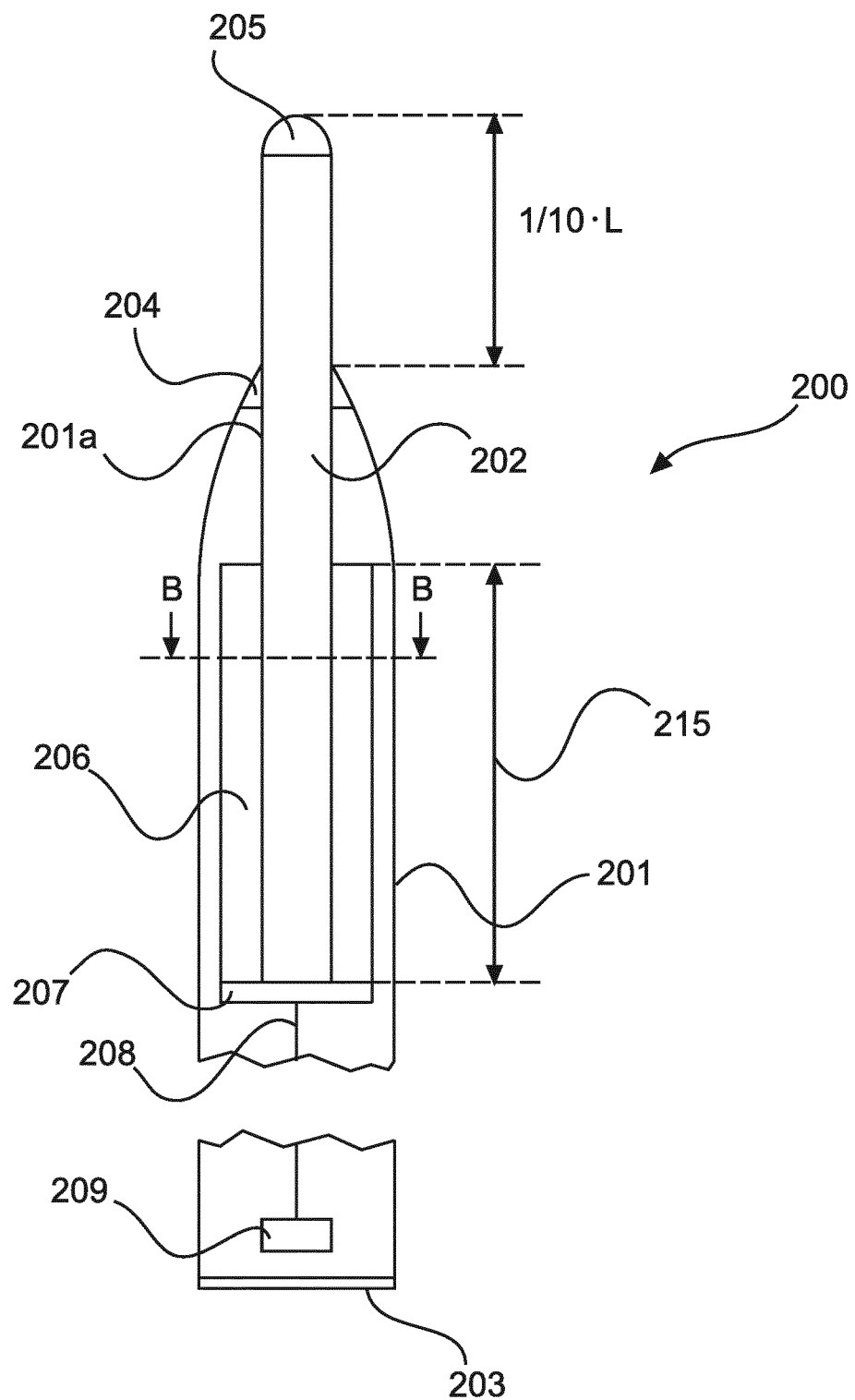
FIG. 5 shows a detail of the rotor blade of FIG. 2 in an extended state, in a further side view.

FIG. 5 shows an enlarged detail of the rotor blade 200 from FIG. 2, the second rotor-blade portion 202 projecting out of the first rotor-blade portion 201. The second rotor-blade portion 202 has a constant profile depth, at least as far as the second rotor-blade tip 205, i.e., a constant size between the nose and the trailing edge, or a constant contour. It is thereby ensured that the second rotor-blade portion 202 can slide without difficulty out of or into an opening 201a correspondingly provided in the first rotor-blade portion 201.

The first rotor-blade portion 201 has a rope winch device 209 and, connected thereto, a rope 208 that is connected to the rope winch device 209 and to the second rotor-blade portion 202. The rope 208 in this case is realized, for example, as a rope made of a synthetic polyethylene-based chemical fibre. The second rotor-blade portion 202 has a stop 207, which strikes on the box 206 in the case of a maximally extended length. The stop 207 prevents the second rotor-blade portion 202 from projecting too far out of the first rotor-blade portion 201. In FIG. 5, the maximum length by which the second rotor-blade portion 202 can project out of the first rotor-blade portion 201 is equal to one tenth of the total length L of the rotor blade 200. The box 206 in this case has a length 215 of one third of the projecting length of the second rotor-blade portion 202.

Figure 6:
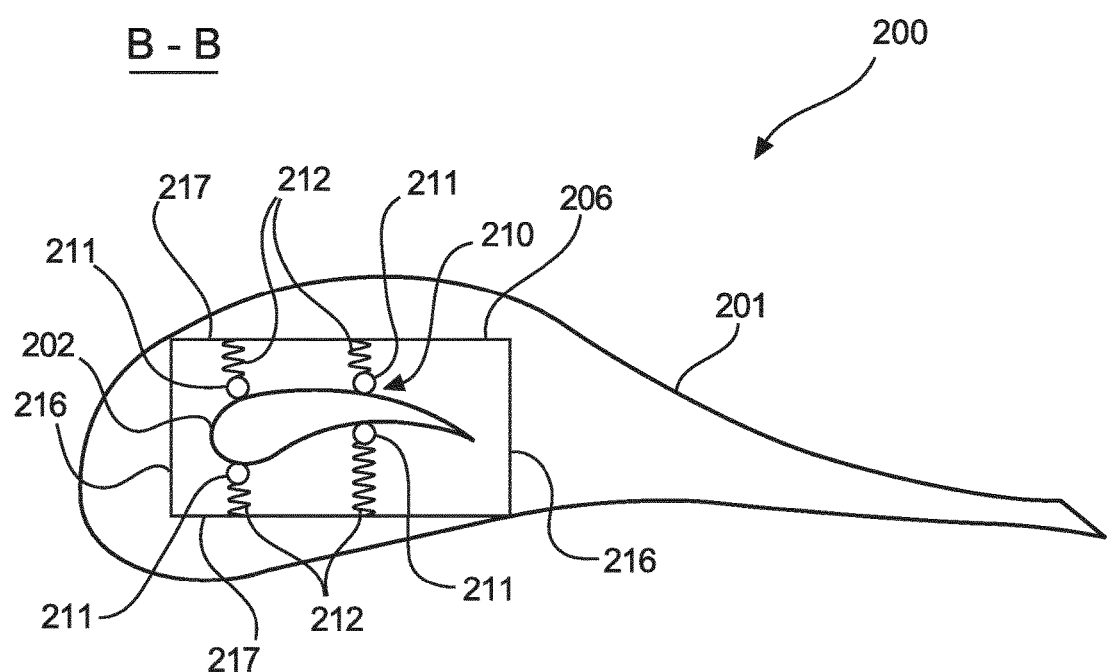
FIG. 6 shows a sectional view of the rotor blade from FIG. 5.

FIG. 6 shows a sectional view B-B of the rotor blade 200 of FIG. 5. It can be seen from FIG. 6 that the second rotor-blade portion 202 is provided inside the box 206 disposed in the first rotor-blade portion 201. The box 206 is part of a guide device 210, by which the second rotor-blade portion 202 is guided out of and back into the first rotor-blade portion 201. The guide device 210 in this case comprises a plurality of rollers 211, and a plurality of spring elements 212, four of each being represented in FIG. 6. Preferably in this case, such rollers 211 and spring elements 212 are distributed over the entire length of the box 206. Owing to the spring elements 212, the rollers 211 are able to adapt to the contour of the second rotor-blade portion 202. The springs 212 have a predefined spring stiffness, which ensures that the second rotor-blade portion 202 is held in a predefined position and, as a result, movement in a longitudinal direction becomes possible.

The box 206 in this case is likewise part of the structure of the first rotor-blade portion 201. The box 206 in this case is composed of two transverse walls 217 that are substantially parallel to each other, and of two side walls 216 that are arranged substantially with respect to each other. Provided on each of the transverse walls 217 are two springs 212 and two rollers 211, which guide the second rotor-blade portion 201 and support it inside the first rotor-blade portion 201.

The invention claimed is:

1. A wind-turbine rotor blade, comprising:
a first rotor-blade portion; and
a second rotor-blade portion,
the first and the second rotor-blade portions together forming a total length of the rotor blade, and the first and second rotor-blade portions configured so that in response to a rotation of the rotor blade, at least one of the first rotor-blade portion and the second rotor-blade portion move relative to each other as a result of a centrifugal force acting upon the rotor blade in such a way that the total length of the rotor blade is altered to an altered total length, wherein the movement is along a longitudinal axis of the rotor blade,
wherein at least a portion of the second rotor-blade portion is disposed in the first rotor-blade portion, wherein the first rotor-blade portion has an opening, a portion of the second rotor-blade portion being configured to move in and out of the opening of the first rotor-blade portion, and
wherein the first rotor-blade portion has a guide device for guiding and supporting the second rotor-blade portion inside the opening of the first rotor-blade portion, the guide device having at least two guide elements for guiding the second rotor-blade portion in the direction of the longitudinal axis of the rotor blade, and at least two spring elements coupling the at least two guide elements to the first rotor-blade portion.

2. The rotor blade according to claim 1, wherein the second rotor-blade portion is connected to the first rotor-blade portion by a rope winch device for retracting the second rotor-blade portion into the first rotor-blade portion.

3. The rotor blade according to claim 2, wherein the rope winch device comprises a rope for fastening to the second rotor-blade portion, the rope being made of a synthetic, polyethylene-based chemical fiber.

4. The rotor blade according to claim 2, wherein the rotor blade has a measuring means for measuring wind speed, and the rope winch device is configured so that the second rotor-blade portion retracts and extends at predefined windspeeds, respectively.

5. The rotor blade according to claim 1, wherein the guide elements are rollers.

6. The rotor blade according to claim 1, wherein the guide device is box shaped and is disposed inside the first rotor-blade portion.

7. The rotor blade according to claim 1, wherein the guide device has a length that is one third of a length of the second rotor-blade portion that moves out of the first rotor-blade portion.

8. The rotor blade according to claim 1, wherein a length of the portion of the second rotor-blade portion that moves out of the opening of the first rotor-blade portion corresponds approximately to one tenth of the total length of the rotor blade.

9. The rotor blade according to claim 1, wherein the first rotor-blade portion has a first rotor-blade tip, and the second rotor-blade portion has a second rotor-blade tip, the first rotor-blade tip and the second rotor-blade tip each being realized as winglets, and the second rotor-blade tip being provided in an opposite direction to the first rotor-blade tip.

10. The rotor blade according to claim 9, wherein the second rotor-blade portion has a stop at an end opposite to the second rotor-blade tip in a longitudinal direction, wherein the stop ensures a predefined extendable length.

11. The rotor blade according to claim 1, wherein the second rotor-blade portion has a substantially constant profile depth over its entire length.

12. The rotor blade according to claim 9, wherein at least one of the first and second rotor-blade portions is produced substantially from a fibrous composite material or wood, and at least one of the first and second rotor-blade tips is produced from a conductive material.

13. The rotor blade according to claim 1, wherein at least one of the first and the second rotor-blade portions is connected to a lightning protection means by a metal rail or a metal cable.

14. A wind turbine comprising:
a nacelle;
a rotor; and
at least one rotor blade according to claim 1 coupled to the rotor.

15. The wind turbine according to claim 14, wherein a diameter of the rotor is enlarged in response to a rotation of the rotor blade.

16. A method for operating a wind turbine having at least one wind-turbine rotor blade according to claim 1, the method comprising:
rotating the at least one wind-turbine rotor blade, wherein rotating the at least one wind-turbine rotor blade causes the second rotor-blade portion to move relative to the first rotor-blade portion as a result of an occurring centrifugal force.

17. The method according to claim 16, wherein the second rotor-blade portion is moved out of the first rotor-blade portion as a result of the centrifugal force occurring such that a surface area of the at least one wind-turbine rotor blade acted upon by the wind is enlarged.

18. The method according to claim 16, further comprising moving the second rotor-blade portion back into the first rotor-blade portion using a rope winch device such that a first surface area of the rotor blade acted upon by wind is reduced in comparison with a second surface area acted upon by the wind in the case of a fully extended second rotor-blade portion.

19. The method according to claim 16, wherein the method occurs in light wind.

20. The rotor blade according to claim 1, wherein the guide device has four guide elements and four spring elements.

21. The rotor blade according to claim 20, wherein guide device includes a box, wherein the four guide elements are four rollers, wherein the four rollers and the four spring elements are distributed over an entire length of the box.

* * * * *